(12) United States Patent
Kurian et al.

(10) Patent No.: US 11,107,068 B2
(45) Date of Patent: Aug. 31, 2021

(54) INLINE AUTHORIZATION STRUCTURING FOR ACTIVITY DATA TRANSMISSION

(71) Applicant: Bank of America Corporation, Charlotte, NC (US)

(72) Inventors: Manu Jacob Kurian, Dallas, TX (US); Paul Grayson Roscoe, Treuddyn (GB); Alex Yi-Shiou Yang, Woodinville, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 682 days.

(21) Appl. No.: 15/692,032

(22) Filed: Aug. 31, 2017

(65) Prior Publication Data

US 2019/0066099 A1    Feb. 28, 2019

(51) Int. Cl.
*G06Q 20/38* (2012.01)
*G06Q 20/40* (2012.01)
*H04L 29/06* (2006.01)
*G06Q 40/02* (2012.01)

(52) U.S. Cl.
CPC ......... *G06Q 20/382* (2013.01); *G06Q 20/401* (2013.01); *H04L 63/08* (2013.01); *G06Q 40/02* (2013.01); *H04L 63/083* (2013.01)

(58) Field of Classification Search
CPC .... G06Q 20/382; G06Q 20/401; G06Q 40/02; H04L 63/08; H04L 63/083
USPC .......................................................... 705/64
See application file for complete search history.

(56) References Cited

U.S. PATENT DOCUMENTS

| | | | |
|---|---|---|---|
| 7,085,923 B2 | 8/2006 | Mraz | |
| 7,395,424 B2 | 7/2008 | Ashley et al. | |
| 7,712,137 B2 | 5/2010 | Meier | |
| 8,321,955 B2 | 11/2012 | Feng et al. | |
| 8,799,997 B2 | 8/2014 | Spiers et al. | |
| 8,813,214 B1* | 8/2014 | McNair | H04L 63/0281 726/12 |
| 8,868,909 B2 | 10/2014 | Mishra et al. | |
| 8,955,075 B2 | 2/2015 | Von Bokern et al. | |

(Continued)

OTHER PUBLICATIONS https://www.pingidentity.com/content/dam/pic/downloads/resources/white-papers/en/mfa-best-practices-securing-modern-digital-enterprise-3001.pdf?id=b6322a80-f285-11e3-ac10-0800200c9a66.
https://www.symantec.com/content/en/us/enterprise/white_papers/two-factor-authentication-tco-viewpoint-wp.pdf.

*Primary Examiner* — Steven S Kim
*Assistant Examiner* — Zesheng Xiao
(74) *Attorney, Agent, or Firm* — Michael A. Springs; Moore & Van Allen PLLC; Vaidehi Bachoti

(57) ABSTRACT

Embodiments of the invention are directed to a system, method, or computer program product for providing inline authorization structuring for activity data transmissions. In particular, the invention provides a secure platform for transmission of activity data associated with an electronic activity and performance of the electronic activity at a recipient system based on inserting an encoded authorization instruction into inline activity data. The encoded authorization instruction comprises a processing instruction required for processing an associated activity data string. The invention provides a novel method for encoding authorization instructions associated with activity data strings. Another aspect of the invention is directed to constructing an inline activity data set configured for secure transmission to a recipient system, for performing an electronic activity associated with the inline activity data set at the recipient system.

22 Claims, 4 Drawing Sheets

(56) References Cited

U.S. PATENT DOCUMENTS

| | | |
|---|---|---|
| 8,984,610 B2 | 3/2015 | Spiers et al. |
| 9,098,687 B2 | 8/2015 | Hayton |
| 9,141,779 B2 | 9/2015 | Shen et al. |
| 9,209,979 B2 | 12/2015 | Spiers et al. |
| 9,374,369 B2 | 6/2016 | Mahaffey et al. |
| 9,424,429 B1 | 8/2016 | Roth et al. |
| 9,584,517 B1* | 2/2017 | Roth ............... G06F 21/6209 |
| 9,614,868 B2 | 4/2017 | Yavuz et al. |
| 2005/0005096 A1 | 1/2005 | Miller |
| 2005/0251857 A1 | 11/2005 | Schunter et al. |
| 2009/0169012 A1 | 7/2009 | Smith et al. |
| 2010/0082991 A1 | 4/2010 | Baldwin et al. |
| 2010/0100466 A1* | 4/2010 | Garrison ............ G06Q 30/04 705/34 |
| 2011/0078080 A1* | 3/2011 | Grube ............. G06F 11/1076 705/44 |
| 2011/0145821 A1 | 6/2011 | Philipson et al. |
| 2011/0145929 A1* | 6/2011 | Jho ................. G06F 21/6245 726/26 |
| 2011/0302400 A1 | 12/2011 | Maino et al. |
| 2012/0017271 A1 | 1/2012 | Smith et al. |
| 2012/0151209 A1 | 6/2012 | Visnyak et al. |
| 2014/0236972 A1 | 8/2014 | William |
| 2015/0339408 A1 | 11/2015 | Cismas et al. |

\* cited by examiner

| | |
|---|---|
| LINE 1 | [FIRST ACTIVITY PARAMETER 1] [FIRST ACTIVITY PARAMETER 2]...[FIRST ACTIVITY PARAMETER N] |
| LINE 2 | [SECOND ACTIVITY PARAMETER 1] [SECOND ACTIVITY PARAMETER 2]...[SECOND ACTIVITY PARAMETER N] |
| LINE 3 | [THIRD ACTIVITY PARAMETER 1] [THIRD ACTIVITY PARAMETER 2]...[THIRD ACTIVITY PARAMETER N] |
| LINE 4 | [FOURTH ACTIVITY PARAMETER 1] [FOURTH ACTIVITY PARAMETER 2]...[FOURTH ACTIVITY PARAMETER N] |
| LINE 5 | [FIFTH ACTIVITY PARAMETER 1] [FIFTH ACTIVITY PARAMETER 2]...[FIFTH ACTIVITY PARAMETER N] |

Figure 3A

INLINE AUTHORIZATION STRUCTURING FOR ACTIVITY DATA TRANSMISSION

FIELD OF THE INVENTION

The present invention is directed to, in general, providing secure transmission of electronic activity data via an inline activity data set. Furthermore, the present invention embraces a novel, proactive approach for securely preforming electronic activities.

BACKGROUND

Over the last few years, there has been a significant increase in the number of electronic activities, due to widespread use of smartphone, tablet computers, laptop computers, transaction terminals, and electronic computing devices in general which are configured for accepting authentication credentials in electronic form. Typically, in conventional systems activity data is transmitted from a source system to another recipient system for the performance of the electronic activity. However, this activity data may be intercepted and modified by unauthorized entities during the transmission. Typically, once the recipient system receives the tampered activity data, it is often impossible for the recipient system to detect the tampering by unauthorized entities prior to performing the tampered electronic activity. The recipient system may only determine the tampering well after the tampered electronic activity is performed and completed, based on receiving a notification from source system or a user associated with initiating the electronic activity that the electronic activity was performed incorrectly. While the tampering of the electronic activity may be identified after the electronic activity has been completed, retroactive rectification and restoration of the original user electronic activity is often not possible after the tampered electronic activity has been completed. There is a need for systems and methods for increasing security of activity data during transmission and processing. The previous discussion of the background to the invention is provided for illustrative purposes only and is not an acknowledgement or admission that any of the material referred to is or was part of the common general knowledge as at the priority date of the application.

SUMMARY

The present invention provides a novel solution to the foregoing shortcomings of conventional systems and provides improvements to technology by employing an inline activity data set and inserting a novel encoded authorization instruction in the inline activity data set. The present invention not only impedes the tampering of the electronic activity data during transmission, but also allows for preemptive identification of any tampering prior to performing the electronic activity and provides for preventing the performance of a tampered electronic activity. In one aspect, the present invention is directed to in general a system for assessing providing inline authorization structuring for activity data transmissions, a corresponding method, and computer program product. The system, the computer program product and the computerized method of the invention provide a secure platform for a secure platform for transmission of data associated with an electronic activity and performance of the electronic activity at a recipient system based on inserting an encoded authorization instruction into inline activity data. The system typically includes at least one processing device operatively coupled to at least one memory device and at least one communication device connected to a distributed network. The system also typically includes a module stored in the at least one memory device comprising executable instructions that when executed cause the processing device and hence the system to perform one or more functions described below. In one embodiment, the system is configured to: receive, from a first networked device, a first activity data string associated with a first electronic activity, wherein the first activity data string comprises activity parameters associated with performing the first electronic activity; generate a first authorization instruction associated with the first electronic activity, wherein the first authorization instruction comprises a processing instruction for a recipient system to perform the first electronic activity; construct an inline activity data set comprising the first activity data string associated with the first electronic activity, wherein the first activity data string associated with the first electronic activity is constructed as a first line item of a plurality of line items of the inline activity data set, wherein the first activity data string associated with the first electronic activity is structured in an activity data format; encode the first authorization instruction associated with the first electronic activity in the activity data format, wherein the first authorization instruction is encoded in the activity data format such that at least a portion of the first encoded authorization instruction matches the first activity data string associated with the first electronic activity; insert the first encoded authorization instruction in the activity data format into the inline activity data set, wherein the first encoded authorization instruction in the activity data format is inserted as a second line item of the plurality of line items of the inline activity data set; establish an operative communication link with the recipient system configured for performing the first electronic activity; and transmit, via the operative communication link, the inline activity data set to the recipient system, wherein the inline activity data set, when processed, is configured to allow the recipient system to perform the first electronic activity based on at least the activity parameters of the first activity data string and the first encoded authorization instruction.

In another embodiment, and in combination with the previous embodiment, encoding the first authorization instruction in the activity data format such that at least a portion of the first encoded authorization instruction matches the first activity data string associated with the first electronic activity further comprises: encoding the first authorization instruction to resemble the first activity data string such that at least a portion of data of the first encoded authorization instruction is in the form of the activity parameters of the first activity data string.

In another embodiment, and in combination with any of the previous embodiments, at least the portion of the data of the first encoded authorization instruction is in a natural language format.

In another embodiment, and in combination with any of the previous embodiments, the processing instruction for the recipient system comprises a predetermined method for processing the activity parameters of the first activity data string to successfully perform the first electronic activity.

In another embodiment, and in combination with any of the previous embodiments, the invention is further configured to: modify at least one activity parameter of the first activity data string associated with the first electronic activity received from a first networked device, wherein the modified first activity data string having the modified at least one activity parameter associated with the first electronic activity is constructed as the first line item of the plurality of line items of the inline activity data set; wherein the at least one activity parameter of the first activity data string is modified such that processing the modified first activity data string having the modified at least one activity parameter from the inline activity data set results in the recipient system unsuccessfully performing the first electronic activity; wherein the processing instruction for the recipient system comprises a predetermined method for altering the modified at least one activity parameter of the modified first activity data string in the inline activity data for successfully performing the first electronic activity at the recipient system.

In another embodiment, and in combination with any of the previous embodiments, the activity data format comprises a low-level programming language format and/or a high-level programming language.

In another embodiment, and in combination with any of the previous embodiments, encoding the first authorization instruction in the activity data format such that at least a portion of the first encoded authorization instruction matches the first activity data string associated with the first electronic activity further comprises: encoding the first authorization instruction to resemble the first activity data string such that: (i) at least a portion of data of the first encoded authorization instruction matches a portion of the first activity data string, and/or (ii) at least a portion of a syntax of the first encoded authorization instruction matches a syntax of the first activity data string.

In another embodiment, and in combination with any of the previous embodiments, encoding the first authorization instruction associated with the first electronic activity in the activity data format further comprises: encoding a pointer in the first authorization instruction, wherein the pointer is an encoded object that is configured to reference the first activity data string of the first line item of a plurality of line items in the inline activity data set; wherein the pointer of the first authorization instruction, when processed by the recipient system, is configured to allow the recipient system to pair the first activity data string associated with the first electronic activity and the first authorization instruction associated with the first electronic activity in the inline activity data set.

In another embodiment, and in combination with any of the previous embodiments, encoding the pointer in the first authorization instruction further comprises: identifying a reference node in the first activity data string associated with the first electronic activity; constructing the pointer in the first authorization instruction such that the pointer references the reference node in the first activity data string associated with the first electronic activity; and inserting the pointer in the first authorization instruction.

In another embodiment, and in combination with any of the previous embodiments, wherein constructing the inline activity data set further comprises: inserting a third line item of the plurality of line items comprising second activity data string associated with a second electronic activity, wherein the second activity data string associated with the second electronic activity is structured in the activity data format; and inserting a fourth line item of the plurality of line items comprising a second encoded authorization instruction associated with the second electronic activity, wherein the second encoded authorization instruction comprises a processing instruction for the recipient system to successfully perform the second electronic activity based on the second activity data string.

In another embodiment, and in combination with any of the previous embodiments, constructing the inline activity data set further comprises: reordering the plurality of line items in the inline activity data set based on a random ordering function.

In another embodiment, and in combination with any of the previous embodiments, the second line item is an arbitrary line item of the plurality of line items, wherein inserting the first encoded authorization instruction as the second line item of the plurality of line items of the inline activity data set comprises inserting the first encoded authorization instruction at the second line item selected randomly.

In another embodiment, and in combination with any of the previous embodiments, the inline activity data set further comprises: a third line item of the plurality of line items comprising second activity data string associated with a second electronic activity, wherein the second activity data string associated with the second electronic activity is structured in the activity data format; wherein the second line item comprising the first encoded authorization instruction further comprises a second encoded authorization instruction associated with the second electronic activity, wherein the second encoded authorization instruction comprises a processing instruction for the recipient system to successfully perform the second electronic activity based on the second activity data string, wherein the second line item, when processed by the recipient system, is configured to allow the recipient system to: identify the first encoded authorization instruction and the second encoded authorization instruction in the second line item; and pair (i) the first activity data string associated with the first electronic activity and the first authorization instruction associated with the first electronic activity and (ii) the second activity data string associated with the second electronic activity and the second authorization instruction associated with the first electronic activity, in the inline activity data set.

In another embodiment, and in combination with any of the previous embodiments, the invention is further configured to: prior to transmitting, via the operative communication link, the inline activity data set to the recipient system, perform a decoding check on the inline activity data set; and transmit, via the operative communication link, the inline activity data set to the recipient system, based on an unsuccessful decoding check, wherein an unsuccessful decoding check is associated with a failure to decipher the inline activity data set.

In another embodiment, and in combination with any of the previous embodiments, the inline activity data set, when processed by the recipient system, is configured to allow the recipient system to: identify the first encoded authorization instruction in the inline activity data set; identify the first activity data string in the inline activity data set; pair the first activity data string associated with the first electronic activity and the first authorization instruction associated with the first electronic activity; decode the first encoded authorization instruction; and perform the first electronic activity by processing the activity parameters of the first activity data string based on the first encoded authorization instruction.

In another embodiment, and in combination with any of the previous embodiments, generate a credential key pair comprising a source credential key sub-component and a target credential key sub-component, wherein the source credential key sub-component and the target credential key sub-component are asymmetric key pairs; transmit, via the operative communication link, the target credential key sub-component to the recipient system; wherein encoding the first authorization instruction associated with the first electronic activity in the activity data format comprises encoding the first authorization instruction using the source credential key sub-component; wherein the target credential key sub-component is structured such that the recipient system is configured to decode the encoded first authorization instruction using the target credential key sub-component.

In another embodiment, and in combination with any of the previous embodiments, wherein encoding the first authorization instruction associated with the first electronic activity in the activity data format further comprises: determining the recipient system associated with the first activity data string; identifying a first credential key pair associated with the recipient system; and encoding the first authorization instruction associated with the first electronic activity in the activity data format using a source credential key sub-component of the first credential key pair; wherein the encoded first authorization instruction, when processed by the recipient system, is structured to allow the recipient system to decode the first authorization instruction using a target credential key sub-component of the first credential key pair, wherein the source credential key sub-component and the target credential key sub-component are asymmetric key pairs.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
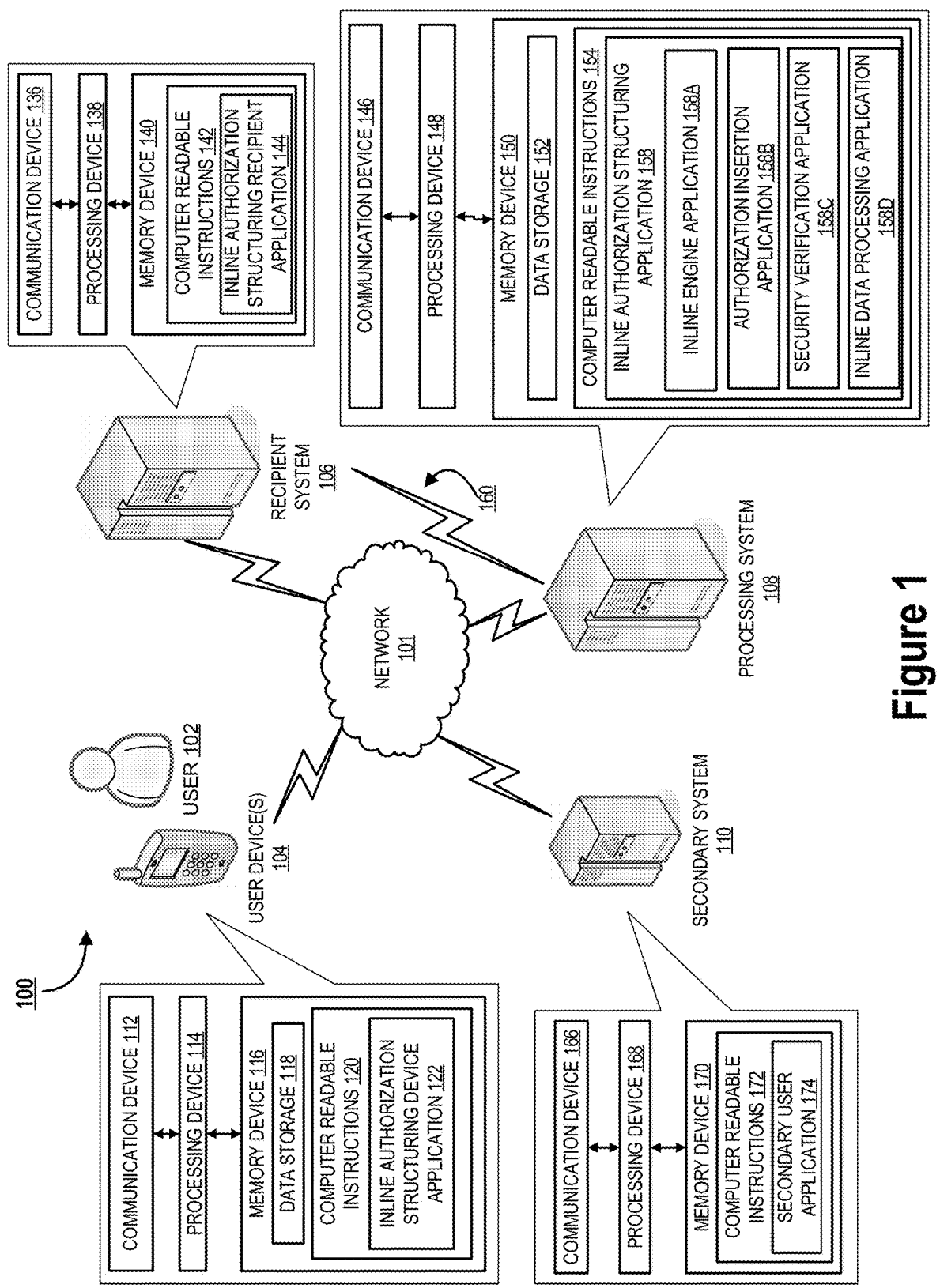
Figure 2:
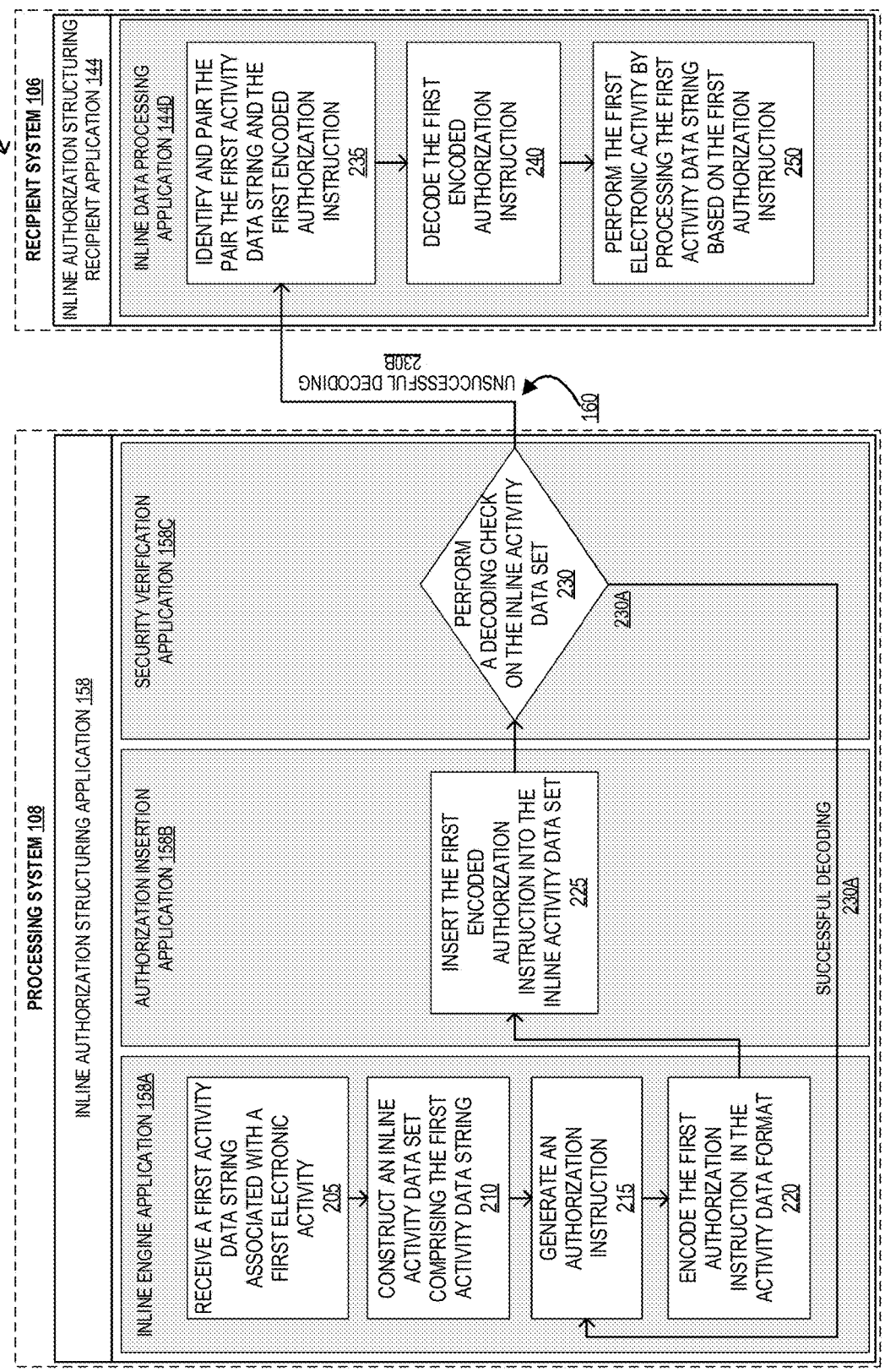
Figure 3B:
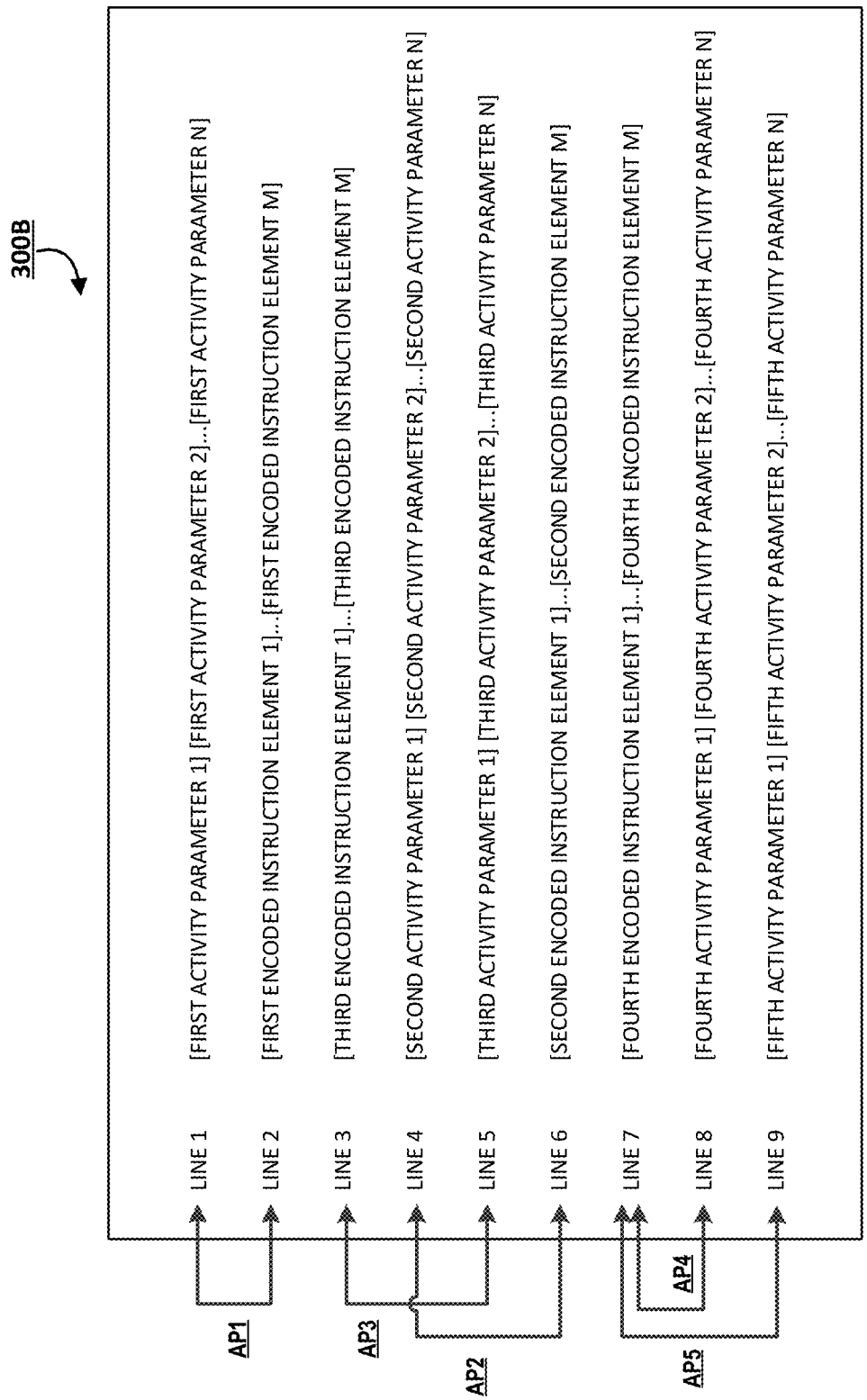

Having thus described embodiments of the invention in general terms, reference will now be made the accompanying drawings, wherein:

FIG. 1 schematically depicts an inline authorization structuring system and environment 100, in accordance with an aspect of the present invention;

FIG. 2 schematically depicts a high level process flow and processing environment 200 for inline authorization structuring for activity data transmissions in accordance with some embodiments of the invention;

FIG. 3A schematically depicts an illustrative representation of an inline activity data set 300A, in accordance with some embodiments of the invention; and FIG. 3B schematically depicts an illustrative representation of an inline activity data set 300B with inserted encoded inline authorization instructions, in accordance with some embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" refers to an organization, a company, a group, an institute, a business or the like associated with initiating and/or performing electronic activities. Typically, the entity comprises systems, devices, applications and/or the like for initiating and/or performing electronic activities. In some embodiments, the entity initiates and/or performs electronic activities in response to receiving instructions from an associated user. In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user information associated with the user, or the like. The account is associated with and/or maintained by an entity. In other embodiments, an "entity" may not be a financial institution. Examples for non-financial entities include cloud computing systems, database systems, block chain systems for data processing, and the like.

Unless specifically limited by the context, an "electronic activity", "user activity", "transaction" or "activity" refers to activities associated with electronic resources, such as the user's resources. In some embodiments, the electronic activity refers to resource transfers between resources, e.g., a transfer of a resource value from a first resource and a second resource. For example, the electronic activity may refer to transmission of resource value comprising predetermined data (e.g. files, text, images, and the like) from a first resource (e.g., a user device, a database, a server, a cloud storage system, and the like) to a second resource (e.g., another device, database, and the like). Typically, a first system (e.g., a user device), for example, based on receiving instructions from a user, transmits activity parameters (e.g., location of the file, time of transmission, unique identifier of the source resource system, certificates of the target resource system, authentication information, and the like) to a recipient system (e.g., a system associated with one or more of the resources, an entity system, and the like) which then performs the electronic activity (transfer of the file from the source resource system to the target resource system). As another example, in some embodiments, the electronic activity refers to transfer of a resource value comprising financial resources (e.g. a predetermined transfer amount) from a first resource (e.g., a source user account) to a second resource (e.g., another target account). Typically, a first system (e.g., a user device), for example, based on receiving instructions from a user, transmits activity parameters (e.g., the transfer amount, time and date of the transfer, unique identifiers of the source user account and the target user account, and the like) to a recipient system (e.g., a financial institution associated with the source account and/or the target account) which then performs the electronic activity (transfer of the predetermined amount from the source user account to the target account).

As such, in some embodiments, an electronic activity or a user activity may refer to a purchase of goods or services, a return of goods or services, a payment transaction, a credit transaction, or other interaction involving a user's resources (e.g., a bank account). As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

With advancements in technology infrastructures and wireless communication implementation, electronic devices such as transaction terminals such as point of sale terminals, portable multi-function devices, such as laptop computers, tablet computers, mobile phones, smart phones, wearable devices and the like are common. Typically, individuals may also have a mobile user device with them. These electronic devices may enable performance of user activities (e.g., financial activities, purchases, resource transfers, accessing resource data stored at other systems and databases and the like) based on requisite authorization. These electronic devices may also be configured to allow the user to perform the one or more user activities, transactions or resource transfers through an application, accept authentication credentials from the user, transmit authentication credentials for validation at external systems, etc.

In some embodiments, unauthorized entities as used herein may refer to systems or individuals that are not authorized to access electronic activity data.

As alluded to previously, there has been a significant increase in the number of electronic activities, due to widespread use of smartphone, tablet computers, laptop computers, transaction terminals, and electronic computing devices in general which are configured for accepting authentication credentials in electronic form. Typically, in conventional systems electronic activity data and associated activity parameters required for performing the activity are transmitted to a recipient system, for the recipient system to perform the activity. For example, a user may initiate a payment transfer electronic activity on a user device comprising a payment to another secondary user. The user may then provide activity data required for the payment transfer on the user device, such as a source account number associated with the user, a target account number associated with the secondary user, time for the transfer, and the like. Activity data required for the payment transfer, provided by the user on the user device, is then transmitted to a recipient system (e.g., in a payment file), such as a financial institution system for executing the payment transfer. This activity data being sent to the recipient system is typically in a natural language.

However, this activity data may be intercepted and modified by unauthorized entities during the transmission. For example, the user device may transmit the activity data via an unsecure Wi-Fi connection. Unauthorized individuals may access the data while it is being transmitted through the unsecure connection and modify/tamper with the activity data. For example, the unauthorized individuals may change a target account number associated with the secondary user to another account number associated with the unauthorized individual and transmit the modified activity data to the recipient system. Typically, once the recipient system receives the tampered activity data, it is often impossible for the recipient system to detect the tampering by unauthorized entities prior to performing the tampered electronic activity. The recipient system may only determine the tampering well after the tampered electronic activity (e.g., payment transfer) is performed and completed, based on receiving a notification from source system or a user associated with initiating the electronic activity that the electronic activity was performed incorrectly. For example, tampering is detectable by the user only after the payment transfer to the unauthorized individual is completed and posted in the user's account, at which time is not possible to rectify the unauthorized action. While the tampering of the electronic activity may be identified after the electronic activity has been completed, retroactive rectification and restoration of the original user electronic activity is often not possible after the tampered electronic activity has been completed.

The present invention provides a novel solution to the foregoing shortcomings of conventional systems and provides improvements to technology by employing an inline activity data set and inserting a novel encoded authorization instruction in the inline activity data set. Specifically, the present invention inserts an authorization instruction, specific to the particular user activity, along with the activity data in an inline activity data set, prior to transmission to the recipient system. The authorization instruction is required for the recipient system to process the activity data to subsequently perform the electronic activity (e.g., the payment transfer). In particular, the authorization instruction is encoded (e.g., using an asymmetric key of a key pair associated with the system and the recipient system) to resemble activity data, for example, in the form of activity parameters (for example, parameters of a similar structure/syntax, but a different value that that of the activity data from the user). Because the authorization instruction is encoded to resemble activity data, an unauthorized individual intercepting the data will perceive two separate activities (i.e., a first payment transfer associated with the actual activity data received from the user, and a second payment transfer associated with the authorization instruction is encoded to resemble activity data). An unauthorized individual intercepting the data cannot distinguish which portion of the transmitted data relates to the activity parameters and which portion relates to the authorization instruction. Even if the unauthorized individual tampers with the activity data, the recipient system will be unable to execute the activity because the authorization instruction specific to the particular user activity will not be compatible with the tampered data. Alternatively, if the unauthorized individual assumes that the authorization instruction encoded to resemble the activity data relates to a transaction and tampers it, the recipient system will not be able to process the activity data using the tampered authorization instruction data.

Hence, the present invention not only impedes the tampering of the electronic activity data during transmission, but also allows for preemptive identification of any tampering prior to performing the electronic activity and provides for preventing the performance of a tampered electronic activity (e.g., any modification to the data renders the data incompatible for processing). In addition, the system modifies the activity data (e.g., account information) received from the user prior to transmission, in such a way that only the decoded authorization instruction is able to restore the original activity data for processing at the recipient system, thereby further increasing the security of the data. Hence, unauthorized individual intercepting the data will perceive incorrect activity data (e.g., account information).

Embodiments of the present invention address the above needs and/or achieve other advantages by providing apparatuses (e.g., a system, computer program product and/or other devices) and methods for providing inline authorization structuring for activity data transmissions, as will be described in detail elsewhere in the specification. FIG. 1 illustrates an inline authorization structuring system environment 100, in accordance with some embodiments of the present invention. FIG. 1 provides a unique system that includes specialized servers and systems, communicably linked across a distributive network of nodes required to perform the functions of providing dynamic security and encoding paradigms. The authentication system provides a secure platform for transmission of electronic activity data based on inline authorization structuring of electronic activity data.

As illustrated in FIG. 1, a processing system 108, or inline authorization structuring system 108 or application server (e.g., a financial institution system 108) is operatively coupled, via a network 101 to user device(s) 104 (also referred to as one or more source devices 104 or a first device or system 104), to the recipient system 106 (e.g., another second financial institution system 106) and to one or more secondary systems 110. In this way, the processing system 108 can send information to and receive information from the user device(s) 104, the recipient system 106, and one or more secondary systems 110. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means.

In some embodiments, the user 102 is an individual that has a user device, such as a mobile phone, tablet, or the like and who seeks to perform one or more electronic activities or user activities. FIG. 1 also illustrates a user device(s) 104. The user device(s) may refer to a device or a combination of devices that are configured to capture (i.e., receive and/or process) one or more instructions, inputs, authentication credentials, and the like from the user such as a computing device (e.g., a mobile device, a smart phone, a laptop computer and/or another computing device), smart devices (e.g., smart TVs, smart doors, smart speakers, personal digital assistant devices), wearable devices (e.g., smart watches, fitness devices, virtual/augmented reality devices), GPS devices, proximity/location sensors/beacon devices, visual capture devices and/or the like to capture authentication credentials associated with the user. The user device(s) 104 may be, for example, a desktop personal computer, a mobile system, such as a cellular phone, smart phone, personal data assistant (PDA), laptop, or the like. The user device(s) 104 generally comprises a communication device 112 comprising input/output devices and/or sensors, a processing device 114, and a memory device 116. The user device(s) 104 may comprise other devices that are not illustrated, configured for location determination/navigation (GPS devices, accelerometers and the like), for authentication (fingerprint scanners, microphones, iris scanners and the like), for image capture (cameras, AR devices and the like), for display (screens, hologram projectors and the like), and other purposes. The user device(s) 104 is a computing system that enables the user to perform one or more user activities. The processing device 114 is operatively coupled to the communication device 112 and the memory device 116. The processing device 114 uses the communication device 112 to communicate with the network 101 and other devices on the network 101, such as, but not limited to the processing system 108. As such, the communication device 112 generally comprises a modem, server, or other device for communicating with other devices on the network 101.

The user device(s) 104 comprises computer-readable instructions 120 and data storage 118 stored in the memory device 116, which in one embodiment includes the computer-readable instructions 120 of a inline authorization structuring device application 122. In some embodiments user device(s) 104 may refer to multiple user devices that may be configured to communicate with each other, with the processing system and/or other systems via the network 101. In some embodiments, the processing system 108 transmits and/or causes the processing device 114 to install/store the inline authorization structuring device application 122 on the user device 104. In some embodiments, the inline authorization structuring device application 122, when executed by the processing device 114 is configured to cause the user device 104 to perform one or more steps described herein. In some embodiments, the inline authorization structuring device application 122 is similar to the inline authorization structuring application 158 described below. The inline authorization structuring device application 122 may be a standalone application configured for receiving activity data/instructions associated with an electronic activity from a user, transmitting electronic activity data and/or generating an inline activity data set as described herein, or the inline authorization structuring device application 122 may refer to one or more existing applications on the user device that are configured to perform one or more of these steps. In some embodiments the processing system 108 and/or the financial institution system may transmit control signals to the user device, configured to cause the inline authorization structuring device application 122 to perform one or more functions or steps associated with inline authorization structuring, for example, causing the application to trigger one or more sensors or input devices of the user device 104 to capture an authentication credential based on instructions receiving in an capture signal from the processing system 108, to cause the user device 104 to request information from the user, and the like.

As further illustrated in FIG. 1, the processing system 108 or the inline authorization structuring system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 148 is operatively coupled to the communication device 146 and the memory device 150. The processing device 148 uses the communication device 146 to communicate with the network 101 and other devices on the network 101, such as, but not limited to the recipient system 106, the user device(s) 104 and the secondary system(s) 110. As such, the communication device 146 generally comprises a modem, server, or other device for communicating with other devices on the network 101.

As further illustrated in FIG. 1, the processing system 108 comprises computer-readable instructions 154 stored in the memory device 150, which in one embodiment includes the computer-readable instructions 154 of an inline authorization structuring application 158. In some embodiments, the memory device 150 includes data storage 152 for storing data related to the system environment, but not limited to data created and/or used by the inline authorization structuring application 158. In some embodiments, executing the computer readable instructions of the inline authorization structuring application 158 causes the processing device 148 to perform one or more steps for inline authorization structuring described herein. In some embodiments, the inline authorization structuring application 158 may comprise various component applications or parts 158A-D, one or more of which may reside of the memory device 150 or on other external systems (e.g., the server systems) in operative communication with the processing system 108. The inline engine application 158A is configured for generating and encoding authorization instructions associated with activity data of electronic activities. The authorization insertion application 158B is configured for inserting the encoded authorization instructions in an inline activity data set. The security verification application 158C is configured for performing decoding checks on the inline activity data prior to transmission of the inline activity data to the recipient system 106. The inline data processing application 158D is configured for processing inline activity data sets received from other systems (e.g., user device 104, recipient system 106, secondary system 110, and the like).

In the embodiment illustrated in FIG. 1 and described throughout much of this specification, the inline authorization structuring application 158 may receive electronic activity data from the user devices 104. In some embodiments, the processing system 108 may retrieve user authentication information, capture device information, financial information and the like from the user devices 104 and/or the recipient system 106. In this way, the inline authorization structuring application 158 may communicate with the recipient system 106, the user device(s) 104, secondary system 110, merchant systems and other third party systems.

In some embodiments, the inline authorization structuring application 158 may control the functioning of the user device(s) 104. In some embodiments, the inline authorization structuring application 158 computer readable instructions 154 or computer-readable program code, the when executed by the processing device 148, causes the processing device to perform one or more steps described herein and/or transmit control instructions to other systems and devices to cause the systems and devices to perform specific tasks.

As illustrated in FIG. 1, the recipient system 106 is connected to the processing system 108 and may be associated with a financial institution network (e.g., a recipient bank for an account transfer electronic activity). The recipient system 106 may refer to a financial institution system, a transaction terminal or other devices or systems associated with performing the sure activity. In this way, while only one recipient system 106 is illustrated in FIG. 1, it is understood that multiple network systems may make up the system environment 100. In some embodiments, the recipient system 106 is substantially similar to the processing system 108. The recipient system 106 generally comprises a communication device 136, a processing device 138, and a memory device 140. The recipient system 106 comprises computer-readable instructions 142 stored in the memory device 140, which in one embodiment includes the computer-readable instructions 142 of an inline authorization structuring recipient application 144. In some embodiments, the processing system 108 (e.g., based on executing the application 158) transmits and/or causes the processing device 138 to install/store the inline authorization structuring recipient application 144 on the recipient system 106. In some embodiments, the inline authorization structuring recipient application 144, when executed by the processing device 138 is configured to cause the recipient system 106 to perform one or more steps described herein (e.g., decode and process inline activity data sets received from the processing system). In some embodiments, the inline authorization structuring recipient application 144 is similar to the inline authorization structuring application 158 described above. The recipient system 106 may communicate with the processing system 108 to receive inline activity data sets, indicate processing of inline activity data sets, indicate completion of an electronic activity, request validation of authentication credentials and the like. The processing system 108 may communicate with the recipient system 106 via a secure connection 160 generated for secure encrypted communications between the two systems. In some embodiments, the secure connection 160 may be an operative communication link/channel established via the network 101.

The secondary system 110 may be similar to the user device(s) 104 and/or the recipient system 106. The secondary system 110 may comprise a communication device 166, a processing device 168, and a memory device 170. The memory device 170 may further comprise computer readable instructions 172, that when executed by the processing device 168, cause the secondary user application 174 to perform one or more steps described herein. Although illustrated as separate systems, in some embodiments, the processing system 108 may be partially or fully embodied in other systems, such as the user device 104.

It is understood that the servers, systems, and devices described herein illustrate one embodiment of the invention. It is further understood that one or more of the servers, systems, and devices can be combined in other embodiments and still function in the same or similar way as the embodiments described herein. The feature of the invention will now be described with respect to FIG. 2 in conjunction with FIGS. 3A-3B. FIG. 2 schematically illustrates a high level process flow and processing environment 200 for inline authorization structuring for activity data transmissions in accordance with some embodiments of the invention. FIG. 3A schematically illustrates an exemplary representation of an inline activity data set 300A, in accordance with some embodiments of the invention. FIG. 3B schematically depicts an illustrative representation of an inline activity data set 300B having inserted encoded inline authorization instructions, in accordance with some embodiments of the invention.

Referring now to FIG. 2, a high level process flow and processing environment 200 is provided for inline authorization structuring for activity data transmissions. The process flow and processing environment 200 is directed to, in general, a secure platform for transmission of data associated with an electronic activity and performance of the electronic activity at a recipient system based on inserting an encoded authorization instruction into inline activity data. In some embodiments, the "system" as used herein refers to the processing system 108.

The system, via the inline authorization structuring application, generates a credential key pair for communications with the recipient system 106. The credential key pair comprises a source credential key sub-component (e.g., a private key) and a corresponding complementary target credential key sub-component (e.g., a public key). Typically, the source credential key sub-component and the target credential key sub-component are complementary asymmetric key pairs and their encoding is intrinsically linked. The target credential key-sub component is transmitted to the recipient system 106 after generation. The key pairs are constructed such that the electronic activity data transmitted by the system (as described in detailed below) is encoded by the system using source credential key sub-component, and only the recipient system having the target credential key sub-component is able to decode the encoded activity data. In some embodiments, the generation and transmission of the key pairs is a one-time action performed during an initial communication with the recipient system, and are utilized to encode/decode subsequent data transmissions. In other embodiments, the key pairs are generated for each data transmission. In some embodiments, the source credential key sub-component and the target credential key sub-component of the credential key pair are similar to public and private keys utilized in a certificate signing request (CSR), respectively. In some embodiments, the source credential key sub-component and the target credential key sub-component of the credential key pair are structured in accordance with asymmetric public and private keys employed in public-key cryptography for communication between the system and the capture device, respectively. In other embodiments, the source credential key sub-component and the target credential key sub-component of the credential key pair are structured in accordance with symmetric public and private keys of Pretty Good Privacy (PGP) encryption program for communication between the system and the capture device, respectively.

Next, the system may receive (and/or retrieve) data associated with an electronic activity, as indicated by block 205. Typically, a user (or another system) may initiate the first electronic activity, for example, using a graphical user interface provided by the system on the first networked device. The system may then receive a first activity data string associated with a first electronic activity from a first networked device, such as the user device 104. The first activity data string typically comprises activity parameters associated with performing the first electronic activity. Typically, these activity parameters are particulars associated with the first electronic activity which are required to perform the first electronic activity.

For example, the user may initiate the first electronic activity such as a payment transfer. The user may then provide activity parameters associated with the first electronic activity. In addition to or alternative to the user providing activity parameters, the system may retrieve or identify one or more activity parameters associated with the first electronic activity. Continuing with the previous example of a payment transfer electronic activity, the system may receive and/or retrieve activity parameters such as source account/resource unique identifier, target account/resource unique identifier, transfer amount (resource value), date/time of the payment transfer electronic activity, authorization codes, and/or the like. As another example, the first electronic activity may refer to transmission of resource value comprising predetermined data (e.g. files, text, images, and the like) from a first resource (e.g., a user device, a database, a server, a cloud storage system, and the like) to a second resource (e.g., another device, database, and the like). A first networked device (e.g., a user device 104), for example, based on receiving instructions from a user, transmits activity parameters to the system. These activity parameters may include location of the file, time of transmission, unique identifier of the source resource system, certificates of the target resource system, authentication information, and the like.

Based on receiving the activity parameters associated with the first electronic activity, the system, and the inline engine application 158A in particular, may then construct a first activity data string in an activity data format. The activity data format typically comprises a syntax for constructing the activity parameters into the first activity data string. In some embodiments, some or all of the activity parameters are present in natural language or ordinary language in the first activity data string. The system may construct a first activity data string having N activity parameters: "[first activity parameter 1] [first activity parameter 2] . . . [first activity parameter N]". For an example of electronic activity of a payment transfer, the activity parameter 1 maybe a source account unique identifier/number, the activity parameter 2 maybe a target account unique identifier/number, an activity parameter 3 maybe a transfer amount value, an activity parameter 4 maybe a time for payment transfer, an activity parameter 5 maybe an activity type code. Typically, the activity parameters may be ordered/arranged, spaced, and/or separated by other alphanumeric or symbol characters in accordance with the syntax of the activity data format. As discussed, in some embodiments, some or all of the activity parameters are present in alphanumeric characters of natural language in the first activity data string, and may be spaced apart, joined end to end, and/or separated using predetermined alphanumeric characters or predetermined symbol characters. For the previous example of electronic activity of the payment transfer, the first activity data string may be: "aaaa111a bbbb222b 111.11 111111 cc". The system may construct second, third, fourth and fifth activity data strings for other second, third, fourth and fifth electronic activities, as illustrated by lines 2-5 of FIG. 3A. In some embodiments, the activity data format comprises a high-level programming language format, e.g., including activity parameters in natural language characters.

In some embodiments, the activity data format comprises a low-level programming language format.

In some embodiments, for constructing the first activity data string, the system modifies at least one activity parameter associated with the first electronic activity received from a first networked device from the original parameters to a new modified parameter to obfuscate the data during transmission. The system then generates an authorization instruction that indicates the modification, which is encoded for transmission. The processing instruction comprises a predetermined method for altering the particular modified at least one activity parameter of the modified first activity data string for obtaining the original parameters and successfully performing the first electronic activity at the recipient system. Typically it is possible to determine the modification and reverse the modification to obtain the original activity parameters for processing only based on decoding the associated authorization instruction. Typically, the at least one activity parameter of the first activity data string is modified or altered such that processing the modified first activity data string having the modified at least one activity parameter, results in the recipient system unsuccessfully performing the first electronic activity. Continuing with the previous example, the system may modify the activity parameters such that all instances of character 1 are replaced with character 3, resulting in the first activity data string may of: "aaaa333a bbbb222b 333.33 333333 cc". An encoded authorization instruction, described below, maybe structured such that decoding the authorization instruction would indicate the substitution of the character 1 with 3 to the recipient system, which may then replace the character 3 with character 1 to obtain the original/correct parameters (i.e., aaaa111a bbbb222b 111.11 111111 cc) and process the payment transfer. Even if an unauthorized individual intercepts the data transmission and access the modified credentials (e.g., aaaa333a, 333.33, 333333, the security of the original credentials is maintained. Typically, it is not possible to execute the payment transfer using the modified credentials (e.g., aaaa333a, 333.33, 333333). As another example, the system may modify the activity parameter 3 of the transfer amount value such that the decimal point is moved in a particular direction by 2 places, resulting in the modified activity parameter of 1.1111 and the first activity data string may of: "aaaa111a bbbb222b 1.1111 111111 cc". An encoded authorization instruction, described below, maybe structured such that decoding the authorization instruction would indicate the shift of the decimal point to the recipient system. The recipient system may then move the decimal point in the opposite direction by two places to obtain the original/correct parameter (i.e., 111.11) and process the payment transfer for the amount of 111.11.

Next, as illustrated by block 210, the system, based on executing computer readable instructions of the inline engine application 158A, is configured to construct an inline activity data set comprising the first activity data string associated with the first electronic activity. In some embodiments, the first activity data string (or the modified activity data string described below) associated with the first electronic activity is constructed as a first line item of a plurality of line items of the inline activity data set. In some embodiments, the inline activity data set refers to a file or data packet that is transmitted to the recipient system for execution of the associated electronic activities. An inline activity data set may comprise activity data strings associated with one or more electronic activities and is configured such that processing the inline activity data set allows the recipient system to perform the associated one or more electronic activities. For example, the system may construct and insert a third line item of the plurality of line items comprising second activity data string associated with a second electronic activity, wherein the second activity data string associated with the second electronic activity is structured in the activity data format, as described previously. In some embodiments the terms "first", "second" are used with respect to line items indicate that the activity data string is structured as a separate line item, inserted at predetermined line or at an arbitrary line. Accordingly, in such embodiments, a "first line item" does not necessarily indicate that the line item is inserted line 1, a "second line item" does not necessarily indicate that the line item is inserted at line 2 and so on, although that may be so in certain instances. FIG. 3A illustrates an exemplary representation of an inline activity data set 300A having the first activity data string associated with the first electronic activity constructed as a first line item of the inline activity data set 300A at Line 1. The third line item comprising second activity data string associated with the second electronic activity in the inline activity data set 300A is indicated at Line 2. Similarly, the system may construct and insert third, fourth and fifth activity data strings having associated activity parameters into the inline activity data set 300A as separate line items, as indicated by Lines 3-4 of FIG. 3.

Now referring to FIG. 2, as discussed previously, for each activity data string of an electronic activity, the system generates, based on executing computer readable instructions of the inline engine application 158A, a specific or unique authorization instruction, as indicated by block 215. The authorization instruction typically comprises at least one processing instruction (e.g., a data processing instruction, a permission instruction to indicate authorization for the electronic activity, a pointer instruction indicating a reference object of the associated activity data string, a data modification instruction to obtain original parameters, a predetermined method and/or the like) that is required for identifying and processing the associated activity data string and successfully performing the electronic activity at the recipient system. The activity line item pair having the activity data string and the associated authorization instruction is required for processing the associated electronic activity at the recipient system. Typically, the activity data string cannot be processed or even identified, and the electronic activity cannot be performed successfully without the associated authorization instruction, and any tampering of either of them would result in discontinuing of the execution electronic activity and transmission of a failure notification, in real time. As such the system may generate a first authorization instruction associated with the first electronic activity, and/or a second authorization instruction associated with the second electronic activity, and so on.

The system then encodes (e.g., based on executing computer readable instructions of the inline engine application 158A) each of the authorization instructions in the activity data format, as illustrated by block 220. For instance, the system encodes the first authorization instruction associated with the first electronic activity in the activity data format such that at least a portion of the first encoded authorization instruction matches the first activity data string associated with the first electronic activity. As alluded to previously, the authorization instruction is encoded, using the source credential key sub-component of the credential key pair described previously, to resemble an activity data string. The authorization instruction may typically take the form of technical instructions comprising line instructions, action objects, data/object operators, and/or other handles and syntax. These technical instructions are transformed to resemble an activity data string, and activity parameters in particular, such that the instructions may be decoded and the associated activity data string may be identified and processed correctly only using the target credential key sub-component at the recipient system. Without the target credential key sub-component, the encoded authorization instructions are indistinguishable from other activity data strings. For example, a first authorization instruction associated having instructions for processing the first activity data string (e.g., "[first activity parameter 1] [first activity parameter 2] . . . [first activity parameter N]") associated with the first electronic activity is transformed to match an activity data string. "Matching" as used herein refers to the authorization instruction resembling an activity data string such that the two cannot be distinguished without the target credential key sub-component. Transforming the first authorization instruction to match or resemble an activity data string comprises (i) encoding/transforming at least a portion of data (e.g., technical instructions) of the first encoded authorization instruction into the form of the activity parameters i.e., into encoded instruction elements, and/or (ii) encoding/transforming at least a portion of data (e.g., technical instructions, syntax) of the first encoded authorization instruction into the syntax of the activity data format. For example, the technical instructions of the first authorization instruction may be transformed into 'M' number of encoded instruction elements (similar to activity parameters) having the syntax of the activity data format: "[first encoded instruction element 1], [first encoded instruction element 2], [first encoded instruction element 3] . . . [first encoded instruction element M]" or "ttt23ccd aaa12ee 234 . . . 555521" respectively. As illustrated, the technical instructions are encoded into a format of activity parameters in natural language, having the same structure and syntax as the activity data string, albeit differing in the values or contents of the activity parameters. Here, each encoded instruction element (or a combination) in the activity parameter format representation (e.g., [first encoded instruction element 2], ttt23ccd, etc.) may be associated with a particular processing instruction(s).

As such, in some embodiments, the first authorization instruction is encoded to resemble/match the first activity data string such that: (i) at least a portion of data of the first encoded authorization instruction matches a portion of the first activity data string (e.g., with respect to format, value, characters etc.), and/or (ii) at least a portion of a syntax of the first encoded authorization instruction matches a syntax of the first activity data string. In some embodiments, the system constructs an index or library of technical instruction an associated representations in the activity data format, for example, using the source credential key sub-component. The credential key-pairs are constructed such that, the recipient system can decode the encoded instruction element using the target credential key sub-component to obtain the associated processing instruction.

For the previous example of electronic activity of the payment transfer, the first activity data string may be: "aaaa111a bbbb222b 111.11 111111 cc" or "[first activity parameter 1] [first activity parameter 2] . . . [first activity parameter N]," and the associated encoded authorization instruction may be: "ttt23ccd aaa12ee 234 . . . 555521" or "[first encoded instruction element 1], [first encoded instruction element 2], [first encoded instruction element 3] . . . [first encoded instruction element M]". Because the authorization instruction is encoded to resemble activity data, an unauthorized individual intercepting the data will perceive two separate activities (i.e., a first payment transfer associated with the string "aaaa111a bbbb222b 111.11 111111 cc", and a second payment transfer associated with the string: "ttt23ccd aaa12ee 234 . . . 555521"). An unauthorized individual intercepting the data cannot distinguish which string relates to the activity parameters and which string relates to the authorization instruction. Even if the unauthorized individual tampers with the activity data string (e.g., tampering "aaaa111a bbbb222b 111.11 111111 cc" to "aaaa111a ddd222h 1.11 111111"), the recipient system will be unable to execute the activity because the authorization instruction specific to the particular electronic activity will not be compatible with the tampered data (e.g., ddd222h). Alternatively, if the unauthorized individual assumes that the authorization instruction encoded to resemble the activity data relates to a transaction and tampers it (e.g., "ttt23ccd aaa12ee 234 . . . 555521" to "ttt23ccd ddd222h 234 . . . 555521"), the recipient system will not be able to process the activity data using the tampered authorization instruction data, since the tampered encoded instruction element (e.g., ddd222h) does not comprise an associated processing instruction and cannot be decoded the target credential key sub-component.

In some embodiments, the system is configured to construct multiple inline activity data sets for processing different systems (e.g., the recipient system 106, secondary system 110, etc.). As discussed previously, the system is configured to construct a unique credential key pair for communication with each external system. For example, the system constructs a first credential key pair having a first source credential key sub-component and a first target credential key sub-component for encoding communication with the recipient system 106, and transmits the first target credential key sub-component to the recipient system. Similarly, the system constructs a second credential key pair having a second source credential key sub-component and a second target credential key sub-component for encoding communication with another recipient system (e.g., the secondary system 110), and transmits the first target credential key sub-component to the system.

In some embodiments, in response to receiving the activity data at block 205 and prior to performing the constructing and encoding steps described with respect to blocks 210-220, the system analyzes the activity data to determine the recipient system associated with the first activity data string. The system then identifies the appropriate credential key pair associated with the particular recipient system and encodes the first authorization instruction using the source credential key sub-component of the credential key pair, such that the recipient system may decode the first authorization instruction using the counterpart target credential key sub-component previously transmitted to the recipient system.

In some embodiments, the system is configures to encode a pointer in each authorization instruction that references the associated activity data string. For example, the pointer is an encoded object (e.g., an encoded instruction element) of a first encoded authorization instruction that is configured to intrinsically reference the associated first activity data string of a plurality of line items in the inline activity data set. The pointer is configured such that, when processed by the recipient system, the pointer is configured to allow the recipient system to pair the first activity data string associated with the first electronic activity and the first authorization instruction associated with the first electronic activity in the inline activity data set, even though the activity data string and the authorization instruction may be inserted arbitrarily in the inline activity data set (described below with respect to block 225). Here, the system may first identify a reference node (e.g., a hash, a portion of the activity data string that uniquely identifies the string, a predetermined portion of the activity data string, metadata of the activity data string, a particular combination or order of two portions of the activity data string, and/or the like) in the first activity data string associated with the first electronic activity. Next the system may construct/insert/encode the pointer in the first authorization instruction such that the pointer, when decoded, references the reference node in the first activity data string associated with the first electronic activity. The pointer may be inserted into the encoded authorization instruction after encoding the pointer individually, or the pointer may be encoded together with the authorization instruction.

Typically, the inline engine application 158A is separate from and isolated from the authorization insertion application 158B, the security verification application 158C, the inline data processing application 158D, and/or other applications or systems. In some embodiments, the inline engine application 158A typically only allows read communication to maintain security of the source credential key sub-component and the encoding algorithm. In some embodiments, the inline engine application 158A is configured to perform CRC consistency and security checks (e.g., Cyclic Redundancy Checks, checksums etc.) of its internal code and encoding algorithm, at predetermined time intervals, or at arbitrary time instances to identify any unauthorized access/changes. The inline engine application 158A is further configured to discontinue operation and shut-down in the event that an unauthorized access is identified. In some embodiments, the inline engine application 158A may perform a verification check on the activity data strings and the encoded authorization instructions to ensure that they have been constructed correctly.

Next, as illustrated by block 225, the system, based on executing computer readable instructions of the authorization insertion application 158B, is configured to insert the each encoded authorization instruction in the activity data format into the inline activity data set. As such the authorization insertion application 158B is configured to insert the authorization instruction at a predetermined suitable location (e.g., immediately succeeding the associated activity data string, at the header, at the footer, at a predetermined Line A, etc.) or at a random location, based on determining whether a line item exists at the location. For instance, the system may insert the first encoded authorization instruction associated with the first activity data string at Line 1, as a second line item of the plurality of line items of the inline activity data set at Line 2, as illustrated by the inline activity data set 300B of FIG. 3B. As such, the "second line item" is an arbitrary line item and the system may insert the first encoded authorization instruction as a line item at any suitable line, for example, selected randomly. For example, a second encoded authorization instruction ("[second encoded instruction element 1] . . . [second encoded instruction element M]") of the activity data string ("[second activity parameter 1] [second activity parameter 2] . . . [second activity parameter N]") associated with the second electronic activity present at Line 4, maybe inserted as a line item at Line 6, as illustrated by FIG. 3B. As another example, a third encoded authorization instruction ("[third encoded instruction element 1] . . . [third encoded instruction element M]") of the activity data string ("[third activity parameter 1] [third activity parameter 2] . . . [third activity parameter N]") associated with a third electronic activity present at Line 5, maybe inserted as a line item at Line 3, as illustrated by FIG. 3B.

In some embodiments, the encoded authorization instruction is a compound encoded authorization instruction comprising multiple encoded authorization instructions, each of the multiple encoded authorization instructions relating to a particular activity data string associated with a certain electronic activity. For example, referring to FIG. 3B, (i) a first portion of the instruction elements of the compound encoded authorization instruction at Line 7 ("[fourth encoded instruction element 1] . . . [fourth encoded instruction element K]") comprise processing instructions for a fourth activity data string associated with a fourth electronic activity at Line 8 ("[fourth activity parameter 1] [fourth activity parameter 2] . . . [fourth activity parameter N]"), and (ii) a second portion of the instruction elements of the compound encoded authorization instruction at Line 7 ("[fourth encoded instruction element K+1] . . . [fourth encoded instruction element M]") comprise processing instructions for a fifth activity data string associated with a fifth electronic activity at Line 9 ("[fifth activity parameter 1] [fifth activity parameter 2] . . . [fifth activity parameter N]").

In some embodiments, the system is configured to reorder some or all of the plurality of line items (Lines 9) in the inline activity data set 300B based on a random ordering function feature of the authorization insertion application 158B. The intrinsic connections between a pair of the activity data string and the associated authorization instruction are inherently maintained due to the encoded pointer objects described above, and can be paired at the recipient system based on decoding the authorization instructions. In this way, the possibility of an unauthorized individual identifying a pair of the activity data string and the associated authorization instruction is further diminished. In some embodiments, the inline engine application 158A, the authorization insertion application 158B, the security verification application 158C, and the inline data processing application 158D are separate and isolated from each other so that any compromise of a particular application is contained with that particular application.

Prior to transmitting the inline activity data set to the recipient system, based on executing computer readable instructions of the security verification application 158C, the system is configured to perform a decoding check on the inline activity data set, as illustrated by block 230 of FIG. 2. As discussed, the security verification application 158C is isolated from the inline engine application 158A and the authorization insertion application 158B and does not have access to the respective encoding and insertion algorithms. However, the security verification application 158C performs the decoding check to attempt to identify the authorization instructions, identify pairs of the activity data string and associated authorization instruction, decode the authorization instruction, and/or process the activity data string based on the decoded authorization instruction. If the security verification application 158C is able to successfully decode the inline activity data set, i.e., if the application 158C is able to identify the authorization instructions, identify pairs of the activity data string and associated authorization instruction, decode the authorization instruction, and/or process the activity data string based on the decoded authorization instruction, the system transmits the inline activity data set back to the inline engine application 158A for re-encoding (e.g., using a higher encryption) and inserting the authorization instructions, as indicated by arrow 230A. Alternatively, if the security verification application 158C is unable to successfully decode the inline activity data set, i.e., if the application 158C is unable to identify the authorization instructions, unable to identify pairs of the activity data string and associated authorization instruction, unable to decode the authorization instruction, and unable to process the activity data string based on the decoded authorization instruction, the system transmits the inline activity data set to the recipient system 106, as indicated by arrow 230B.

The inline activity data set is transmitted to the recipient system 106, via an established operative communication link 160 of the network 101. The inline authorization structuring recipient application 144 of the recipient system 106 may comprise an inline data processing application 144D which is substantially similar to the inline data processing application 158D.

Next, as illustrated by block 235 of FIG. 2, based on executing computer readable instructions of the inline data processing application 144D, the recipient system is configured to identify and pair the pair the first activity data string and the first encoded authorization instruction in the received inline activity data set. In some embodiments, the recipient system may utilize the target credential key sub-component to process or at least partially decode (e.g., using a first decoding step) the received inline activity data set to identify the inserted encoded authorization instructions. Similarly, the system may identify the activity data strings. Next, the system may (e.g., using a second decoding step to identify the pointer objects) identify, for each activity data string, an associated authorization instruction, thereby identifying pairs of associated activity data strings and authorization instructions.

For example, as illustrated by FIG. 3B, the recipient system may identify (e.g., using the target credential key sub-component), a first activity pair AP1 comprising the first activity data string at Line 1 and the first authorization instruction at Line 2, associated with the first electronic activity. Similarly, the recipient system may identify, a second activity pair AP2 comprising the second activity data string at Line 4 and the second authorization instruction at Line 6, associated with the second electronic activity, and a fourth activity pair AP4 comprising the fourth activity data string at Line 8 and the pertinent portion of the compound fourth authorization instruction at Line 7 having processing instruction associated with the fourth activity data string. Similarly, the recipient system may identify the third activity pair AP3 and the fifth activity pair AP5.

Referring to FIG. 2, the recipient system may then decode each of the encoded authorization instructions, using the target credential key sub-component, as illustrated by block 240. In this way the recipient system may obtain the processing instructions for processing the associated activity data strings. Next, as illustrated by block 250, the system may process each of the activity data strings based on the processing instructions of the associated authorization instruction to execute/perform the associated electronic activity. The recipient system may then transmit a confirmation to the system 108 indicating the successful completion of the one or more electronic activities.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing inline authorization structuring for activity data transmissions, wherein the system provides a secure platform for transmission of data associated with an electronic activity and performance of the electronic activity at a recipient system based on inserting an encoded authorization instruction into inline activity data, the system comprising:
   at least one memory device;
   at least one communication device connected to a distributed network;
   at least one processing device operatively coupled to the at least one memory device; and a module stored in the at least one memory device comprising executable instructions that when executed by the at least one processing device, cause the at least one processing device to:
generate a credential key pair comprising a source credential key sub-component and a target credential key sub-component, wherein the source credential key sub-component and the target credential key sub-component are asymmetric key pairs;
establish an operative communication link with a recipient system configured for performing the first electronic activity;
transmit, via the operative communication link, the target credential key sub-component to the recipient system;
receive, from a first networked device, a first activity data string associated with a first electronic activity, wherein the first activity data string comprises activity parameters associated with performing the first electronic activity;
generate a first authorization instruction associated with the first electronic activity, wherein the first authorization instruction comprises a processing instruction for a recipient system to perform the first electronic activity, wherein generating the first authorization instruction comprises:
modifying at least one of the activity parameters of the first activity data string received from a first networked device such that processing the first activity data string having the modified at least one activity parameter at the recipient system results in unsuccessful performance of the first electronic activity; and
wherein modifying the at least one activity parameter for unsuccessful performance of the first electronic activity comprises at least one of (i) replacing all instances of a correct character in the at least one activity parameter with an incorrect character, and/or (ii) repositioning of a predetermined character along a first direction in the at least one activity parameter to an incorrect position;
construct an inline activity data set comprising the first activity data string comprising the modified activity parameters, wherein the first activity data string is constructed as a first line item of a plurality of line items of the inline activity data set, wherein the first activity data string comprising the modified activity parameters is structured in an activity data format;
encode, via the source credential key sub-component, the first authorization instruction associated with the first electronic activity in the activity data format to construct a first encoded authorization instruction, such that:
at least a portion of the first encoded authorization instruction matches the first activity data string associated with the first electronic activity; and
wherein the encoded authorization instruction comprises pseudo activity parameters for performing a pseudo electronic activity;
insert the first encoded authorization instruction in the activity data format into the inline activity data set, wherein the first encoded authorization instruction in the activity data format is inserted as a second line item of the plurality of line items of the inline activity data set; and
transmit, via the operative communication link, the inline activity data set to the recipient system, wherein the inline activity data set, when processed via the target credential key sub-component, is configured to allow the recipient system to perform the first electronic activity based on at least the activity parameters of the first activity data string and the first encoded authorization instruction.

2. The system of claim 1, wherein encoding the first authorization instruction in the activity data format such that at least the portion of the first encoded authorization instruction matches the first activity data string associated with the first electronic activity further comprises:
encoding the first authorization instruction to such that at least a portion of data of the first encoded authorization instruction is in the form of the activity parameters of the first activity data string.

3. The system of claim 2, wherein at least the portion of the data of the first encoded authorization instruction is in a natural language format.

4. The system of claim 1, wherein the processing instruction for the recipient system comprises a predetermined method for processing the activity parameters of the first activity data string to successfully perform the first electronic activity.

5. The system of claim 1:
wherein the modified first activity data string having the modified at least one activity parameter associated with the first electronic activity is constructed as the first line item of the plurality of line items of the inline activity data set;
wherein the at least one activity parameter of the first activity data string is modified such that processing the modified first activity data string having the modified at least one activity parameter from the inline activity data set results in the recipient system unsuccessfully performing the first electronic activity; and
wherein the processing instruction for the recipient system comprises a predetermined method for altering the modified at least one activity parameter of the modified first activity data string in the inline activity data for successfully performing the first electronic activity at the recipient system.

6. The system of claim 1, wherein encoding the first authorization instruction in the activity data format such that at least the portion of the first encoded authorization instruction matches the first activity data string associated with the first electronic activity further comprises:
encoding the first authorization instruction such that: (i) at least the portion of data of the first encoded authorization instruction matches a corresponding portion of the first activity data string, and/or (ii) at least a portion of a syntax of the first encoded authorization instruction matches a syntax of the first activity data string.

7. The system of claim 1, wherein encoding the first authorization instruction associated with the first electronic activity in the activity data format further comprises:
encoding a pointer in the first encoded authorization instruction, wherein the pointer is an encoded object that is configured to reference the first activity data string of the first line item of the plurality of line items in the inline activity data set;
wherein the pointer of the first encoded authorization instruction, when processed by the recipient system, is structured to allow the recipient system to pair the first activity data string associated with the first electronic activity and the first authorization instruction associated with the first electronic activity in the inline activity data set.

8. The system of claim 7, wherein encoding the pointer in the first encoded authorization instruction further comprises:
identifying a reference node in the first activity data string associated with the first electronic activity;
constructing the pointer for the first encoded authorization instruction such that the pointer references the reference node in the first activity data string associated with the first electronic activity; and
inserting the pointer in the first encoded authorization instruction.

9. The system of claim 1, wherein constructing the inline activity data set further comprises:
inserting a third line item of the plurality of line items comprising second activity data string associated with a second electronic activity, wherein the second activity data string associated with the second electronic activity is structured in the activity data format; and
inserting a fourth line item of the plurality of line items comprising a second encoded authorization instruction associated with the second electronic activity, wherein the second encoded authorization instruction comprises a processing instruction for the recipient system to successfully perform the second electronic activity based on the second activity data string.

10. The system of claim 1, wherein constructing the inline activity data set further comprises:
reordering the plurality of line items in the inline activity data set based on a random ordering function.

11. The system of claim 1, wherein the second line item is an arbitrary line item of the plurality of line items, wherein inserting the first encoded authorization instruction as the second line item of the plurality of line items of the inline activity data set comprises inserting the first encoded authorization instruction at the second line item selected randomly.

12. The system of claim 1, wherein the inline activity data set further comprises:
a third line item of the plurality of line items comprising second activity data string associated with a second electronic activity, wherein the second activity data string associated with the second electronic activity is structured in the activity data format;
wherein the second line item comprising the first encoded authorization instruction further comprises a second encoded authorization instruction associated with the second electronic activity, wherein the second encoded authorization instruction comprises a processing instruction for the recipient system to successfully perform the second electronic activity based on the second activity data string, wherein the second line item, when processed by the recipient system, is configured to allow the recipient system to:
identify the first encoded authorization instruction and the second encoded authorization instruction in the second line item; and
pair (i) the first activity data string associated with the first electronic activity and the first authorization instruction associated with the first electronic activity and (ii) the second activity data string associated with the second electronic activity and the second authorization instruction associated with the first electronic activity, in the inline activity data set.

13. The system of claim 1, wherein the module further comprises instructions that cause the at least one processing device to:
prior to transmitting, via the operative communication link, the inline activity data set to the recipient system, perform a decoding check on the inline activity data set; and
transmit, via the operative communication link, the inline activity data set to the recipient system, based on an unsuccessful decoding check, wherein an unsuccessful decoding check is associated with a failure to decipher the inline activity data set.

14. The system of claim 1, wherein the inline activity data set, when processed by the recipient system, is configured to allow the recipient system to:
identify the first encoded authorization instruction in the inline activity data set;
identify the first activity data string in the inline activity data set;
pair the first activity data string associated with the first electronic activity and the first encoded authorization instruction associated with the first electronic activity;
decode the first encoded authorization instruction; and
perform the first electronic activity by processing the activity parameters of the first activity data string based on decoding the first encoded authorization instruction.

15. The system of claim 1:
wherein encoding the first authorization instruction associated with the first electronic activity in the activity data format comprises encoding the first authorization instruction using the source credential key sub-component; and
wherein the target credential key sub-component is structured such that the recipient system is configured to decode the first encoded authorization instruction using the target credential key sub-component.

16. The system of claim 1, wherein encoding the first authorization instruction associated with the first electronic activity in the activity data format further comprises:
determining the recipient system associated with the first activity data string;
identifying a first credential key pair associated with the recipient system; and
encoding the first authorization instruction associated with the first electronic activity in the activity data format using a source credential key sub-component of the first credential key pair;
wherein the encoded first authorization instruction, when processed by the recipient system, is structured to allow the recipient system to decode the first authorization instruction using a target credential key sub-component of the first credential key pair, wherein the source credential key sub-component and the target credential key sub-component are asymmetric key pairs.

17. A computer program product for providing inline authorization structuring for activity data transmissions, whereby the computer program product is structured to provide a secure platform for transmission of data associated with an electronic activity and performance of the electronic activity at a recipient system based on inserting an encoded authorization instruction into inline activity data, comprising a non-transitory computer-readable storage medium having computer-executable instructions that when executed by at least one processing device, cause the at least one processing device to:
generate a credential key pair comprising a source credential key sub-component and a target credential key sub-component, wherein the source credential key sub-component and the target credential key sub-component are asymmetric key pairs;

establish an operative communication link with a recipient system configured for performing the first electronic activity;

transmit, via the operative communication link, the target credential key sub-component to the recipient system;

receive, from a first networked device, a first activity data string associated with a first electronic activity, wherein the first activity data string comprises activity parameters associated with performing the first electronic activity;

generate a first authorization instruction associated with the first electronic activity, wherein the first authorization instruction comprises a processing instruction for a recipient system to perform the first electronic activity, wherein generating the first authorization instruction comprises:

modifying at least one of the activity parameters of the first activity data string received from a first networked device such that processing the first activity data string having the modified at least one activity parameter at the recipient system results in unsuccessful performance of the first electronic activity; and wherein modifying the at least one activity parameter for unsuccessful performance of the first electronic activity comprises at least one of (i) replacing all instances of a correct character in the at least one activity parameter with an incorrect character, and/or (ii) repositioning of a predetermined character along a first direction in the at least one activity parameter to an incorrect position;

construct an inline activity data set comprising the first activity data string comprising the modified activity parameters, wherein the first activity data string is constructed as a first line item of a plurality of line items of the inline activity data set, wherein the first activity data string comprising the modified activity parameters is structured in an activity data format;

encode, via the source credential key sub-component, the first authorization instruction associated with the first electronic activity in the activity data format to construct a first encoded authorization instruction, such that:

at least a portion of the first encoded authorization instruction matches the first activity data string associated with the first electronic activity; and wherein the encoded authorization instruction comprises pseudo activity parameters for performing a pseudo electronic activity;

insert the first encoded authorization instruction in the activity data format into the inline activity data set, wherein the first encoded authorization instruction in the activity data format is inserted as a second line item of the plurality of line items of the inline activity data set; and transmit, via the operative communication link, the inline activity data set to the recipient system, wherein the inline activity data set, when processed via the target credential key sub-component, is configured to allow the recipient system to perform the first electronic activity based on at least the activity parameters of the first activity data string and the first encoded authorization instruction.

18. The computer program product of claim 17, wherein encoding the first authorization instruction in the activity data format such that at least the portion of the first encoded authorization instruction matches the first activity data string associated with the first electronic activity further comprises:

encoding the first authorization instruction such that at least the portion of data of the first encoded authorization instruction is in the form of the activity parameters of the first activity data string.

19. The computer program product of claim 17, wherein:
wherein encoding the first authorization instruction associated with the first electronic activity in the activity data format comprises encoding the first authorization instruction using the source credential key sub-component; and wherein the target credential key sub-component is structured such that the recipient system is configured to decode the first encoded authorization instruction using the target credential key sub-component.

20. A computerized method for providing inline authorization structuring for activity data transmissions, wherein the computerized method provides a secure platform for transmission of data associated with an electronic activity and performance of the electronic activity at a recipient system based on inserting an encoded authorization instruction into inline activity data, the computerized method comprising:

generating, by at least one processing device, a credential key pair comprising a source credential key sub-component and a target credential key sub-component, wherein the source credential key sub-component and the target credential key sub-component are asymmetric key pairs;

establishing, by the at least one processing device, an operative communication link with a recipient system configured for performing the first electronic activity;

transmitting, by the at least one processing device via the operative communication link, the target credential key sub-component to the recipient system;

receiving, by the at least one processing device from a first networked device, a first activity data string associated with a first electronic activity, wherein the first activity data string comprises activity parameters associated with performing the first electronic activity;

generating, by the at least one processing device, a first authorization instruction associated with the first electronic activity, wherein the first authorization instruction comprises a processing instruction for a recipient system to perform the first electronic activity, wherein generating the first authorization instruction comprises:

modifying, by the at least one processing device, at least one of the activity parameters of the first activity data string received from a first networked device such that processing the first activity data string having the modified at least one activity parameter at the recipient system results in unsuccessful performance of the first electronic activity; and wherein modifying the at least one activity parameter for unsuccessful performance of the first electronic activity comprises at least one of (i) replacing all instances of a correct character in the at least one activity parameter with an incorrect character, and/or (ii) repositioning of a predetermined character along a first direction in the at least one activity parameter to an incorrect position;

constructing, by the at least one processing device, an inline activity data set comprising the first activity data string comprising the modified activity parameters, wherein the first activity data string is constructed as a first line item of a plurality of line items of the inline activity data set, wherein the first activity data string comprising the modified activity parameters is structured in an activity data format;

encoding, by the at least one processing device via the source credential key sub-component, the first authorization instruction associated with the first electronic activity in the activity data format to construct a first encoded authorization instruction, such that:
  at least a portion of the first encoded authorization instruction matches the first activity data string associated with the first electronic activity; and
  wherein the encoded authorization instruction comprises pseudo activity parameters for performing a pseudo electronic activity;

inserting, by the at least one processing device, the first encoded authorization instruction in the activity data format into the inline activity data set, wherein the first encoded authorization instruction in the activity data format is inserted as a second line item of the plurality of line items of the inline activity data set; and transmitting, by the at least one processing device via the operative communication link, the inline activity data set to the recipient system, wherein the inline activity data set, when processed via the target credential key sub-component, is configured to allow the recipient system to perform the first electronic activity based on at least the activity parameters of the first activity data string and the first encoded authorization instruction.

21. The computerized method of claim 20, wherein encoding the first authorization instruction in the activity data format such that at least the portion of the first encoded authorization instruction matches the first activity data string associated with the first electronic activity further comprises:
  encoding the first authorization instruction such that at least the portion of data of the first encoded authorization instruction is in the form of the activity parameters of the first activity data string.

22. The computerized method of claim 20, wherein:
wherein encoding the first authorization instruction associated with the first electronic activity in the activity data format comprises encoding the first authorization instruction using the source credential key sub-component; and
wherein the target credential key sub-component is structured such that the recipient system is configured to decode the first encoded authorization instruction using the target credential key sub-component.

\* \* \* \* \*